May 30, 1961  G. T. WESSON  2,986,366
SUPPORT FOR TELEVISION CABINETS AND THE LIKE
Filed June 18, 1959  2 Sheets-Sheet 1
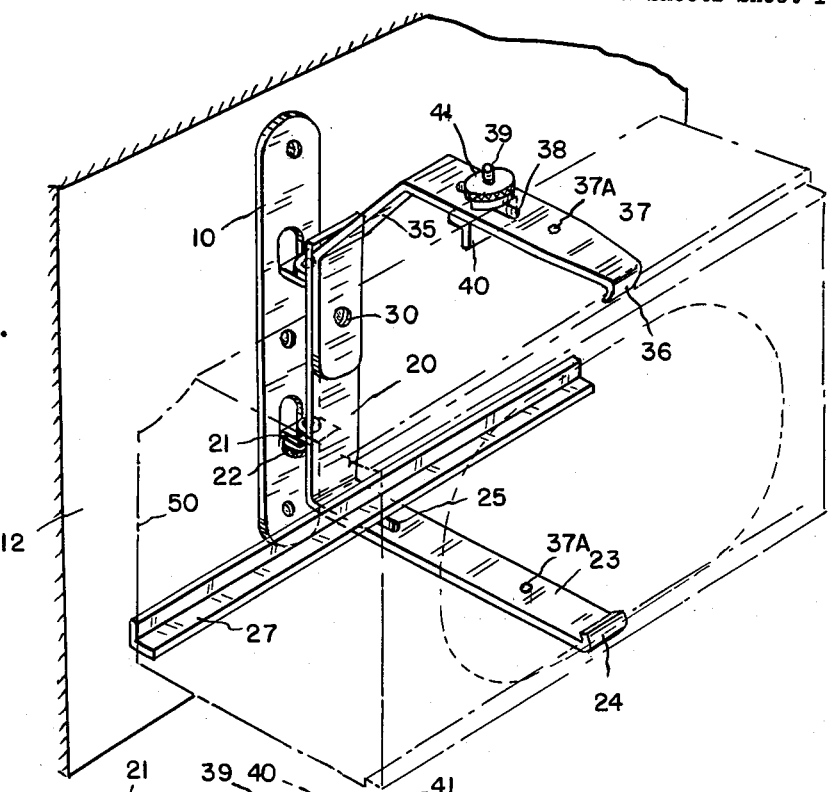
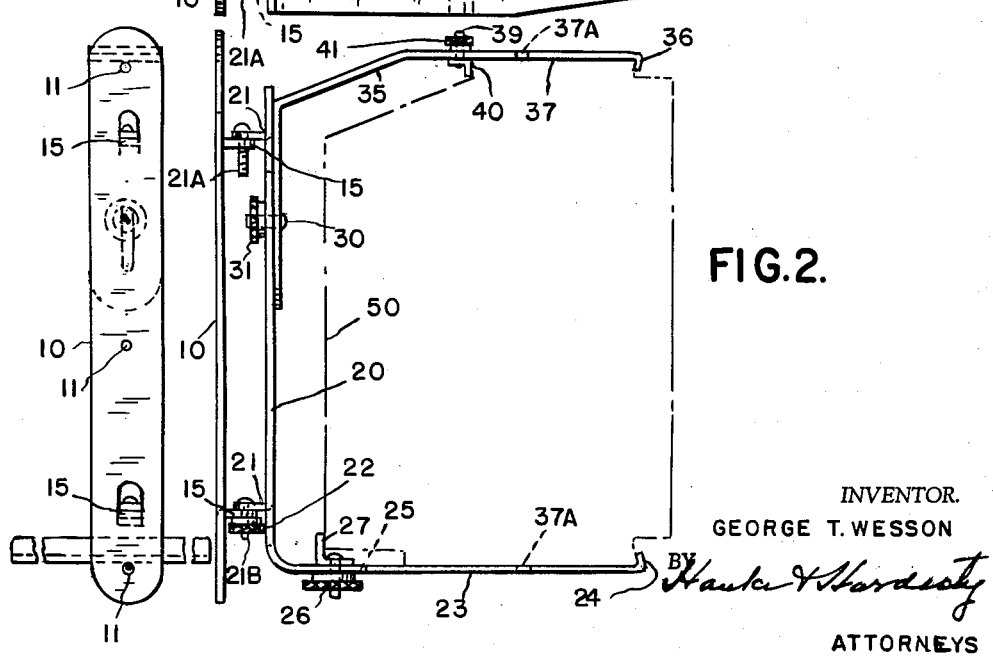
INVENTOR.
GEORGE T. WESSON
BY
ATTORNEYS

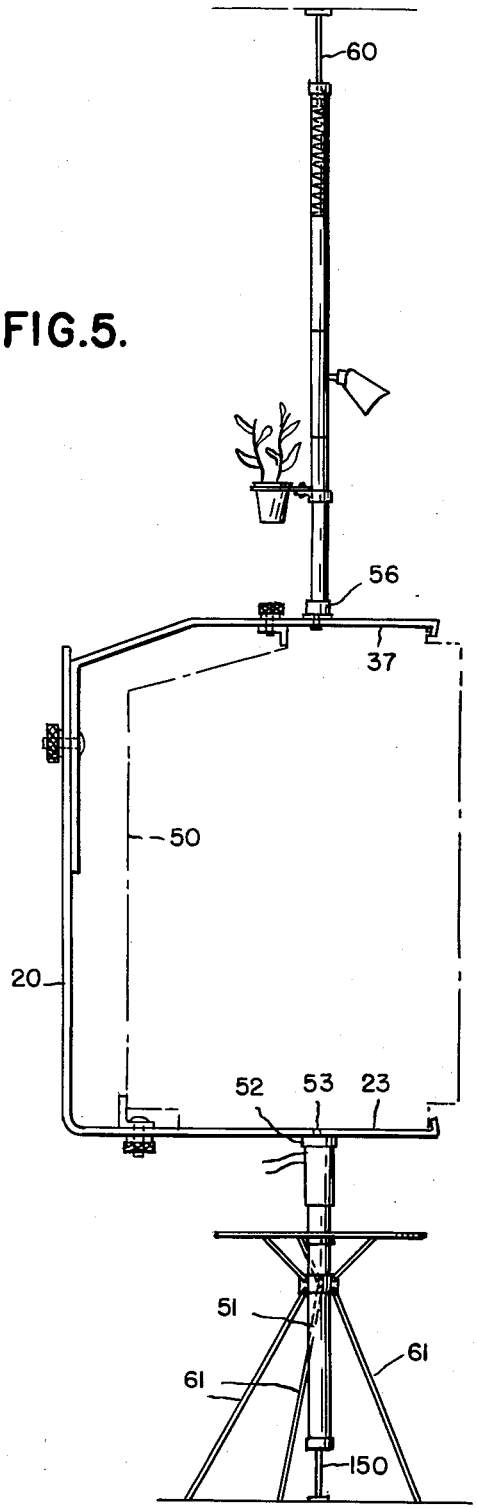

United States Patent Office 2,986,366
Patented May 30, 1961

2,986,366
SUPPORT FOR TELEVISION CABINETS AND THE LIKE
George T. Wesson, 9664 Grand River Ave., Detroit, Mich.
Filed June 18, 1959, Ser. No. 821,149
1 Claim. (Cl. 248—285)

The present invention relates to support means for television cabinets or the like and more specifically to a support adapted to be fixed to a wall of a room or other upright stationary surface.

Among the objects of the invention is to provide a support, a part of which is readily fixed to an upright surface with another part which is readily attached to the cabinet, the two parts then being quickly and easily put together.

Another object is to provide a support of the kind indicated which is substantially completely hidden from view by the supported cabinet.

Other objects and advantages will readily occur to those skilled in the art upon reference to the following description and the accompanying drawings in which Figure 1 is a perspective view of the device showing in dotted lines a cabinet in position.

Figure 2 is an end elevation of the same.

Figure 3 is a rear elevation of the same.

Figure 4 is a plan view of the upper member.

Figure 5 is a view in elevation of a different form of support for the device.

As shown in the drawing, the support comprises a wall bracket 10 consisting of a metal member having suitable openings by means of which it may be fixed to an upright surface 12 such as a wall, door or the like. Member 10 has also punched out tongues 15 extending horizontally and provided with suitable openings to accommodate the studs or pins hereinafter referred to.

The support also includes a frame comprising an upright member 20 comprising punched out tongues 21 spaced to cooperate with the tongues 15 on bracket 10. The upper tongue 21 carries a depending pin 21A fixed in a suitable opening therein and the lower tongue 21 carries fixed to it a similar but threaded depending pin 21B upon which may be threaded a thumb nut 22.

The upright member 20 has its lower end extending forward horizontally a substantial distance as at 28 and is provided at its extreme forward end with a turned up portion or flange 24. This horizontal portion 23 is also provided with a longitudinal slot 25 adjacent the rearward end by means of which and by means of a cooperating bolt and nut 26, there is adjustably fixed an L-section crossbar 27, opening forward. Near the upper end of the upright member 20 is a vertical slot adapted to receive a threaded pin 30 fixed to the upper frame member 35, a suitable nut 31 providing for fixing the member 35 in vertically adjusted position.

Upper frame member 35 consists of a vertically arranged portion fixed through pin 30 and nut 31 to the member 20, and a forwardly extending horizontal portion 37 ending with a downwardly extending flange or hook 36.

At a suitable location, the portion 37 is provided with a longitudinal slot 38 which receives a bolt 39 fixed to a short L-section bar 40. A suitable thumb nut 41 allows adjustment of the bar 40 longitudinally of the member 35.

As indicated, the cabinet, indicated by dotted lines 50, is placed in the frame with its lower rear corner resting in the angle of bars 27, the bars 27 then being moved forward until the cabinet is firmly grasped between bar 27 and flange or hook 24.

The upper member 35 is then located vertically to rest upon the top of the cabinet and with flange or hook 36 at the upper forward corner. The bar 40 is then moved to hold the upper cabinet wall against flange 36. The cabinet with the frame affixed is then attached to the wall bracket by inserting the pins 21A and 21B in the openings in ears 15 and the nut 22 applied to pin 21B to prevent accidental dislodgement.

In Figure 5 the threaded openings 37A are shown as being utilized to support a set upon the form of lighting device known as a "port-a-pole." In making use of such a support, the port-a-pole will have an intermediate section removed and the upper and lower portions utilized as indicated.

In Figure 5 the lower portion of the pole is shown as comprising a jack 150 carried by the pole portion 51 at the upper end of which is a screw cup 52 having means such as the screw 53 by which it is secured to the arm 23 of the set holder, an opening 37A being provided for this purpose. The upper portion of the pole may be fixed to the arm 37 of the set holder in similar fashion by cap 56. The upper end of the pole will include the usual spring plunger 60, and the lower end stabilized with, for example, legs 61.

In order to protect the surface finish of the supported cabinet, the under surface of arm 37 may be lined with felt, cloth or the like, if desired.

I claim:

A support for television sets or the like consisting of a bracket provided with means by which it may be attached to a wall or the like, a frame comprising an upright member having a lower horizontal arm terminating in a short upwardly extending flange and carrying a cross member adjustably positioned on said arm and spaced from said flange, said frame also comprising an upper arm arranged parallel with the lower arm and terminating in a short downwardly extending flange, said upper arm being provided with an adjustably located stop spaced from the flanged end, means for adjusting the distance between said arms, and hinge means for mounting said frame on said bracket.

References Cited in the file of this patent

UNITED STATES PATENTS

| 258,885 | Campbell | June 6, 1882 |
| 755,555 | Weaver | Mar. 22, 1904 |
| 1,149,320 | Arehart | Aug. 10, 1915 |
| 1,556,413 | Buettner | Oct. 6, 1925 |
| 2,367,256 | Atkins | Jan. 16, 1945 |
| 2,631,807 | Witt | Mar. 17, 1953 |

FOREIGN PATENTS

| 193,098 | Austria | Nov. 25, 1957 |
| 465,847 | Germany | Sept. 28, 1928 |
| 1,149,609 | France | July 15, 1957 |